Patented Oct. 2, 1934

1,975,161

UNITED STATES PATENT OFFICE 1,975,161

PROCESS FOR THE DIGESTION OF VEGETABLE GROWTHS TO PRODUCE CELLULOSE

Herman B. Kipper, Accord, Mass.

No Drawing. Application March 14, 1933,
Serial No. 660,649

5 Claims. (Cl. 92—9)

In my co-pending applications Serial Numbers 561,158 of September 4, 1931, and 631,885 of September 6, 1932, are described processing for selective oxidation of organic compounds and of digestion of vegetable growths for production of cellulose or of paper pulp, by means of various chemical compounds containing sulphur. The present invention embodies a very radical improvement along these lines. The basis of my invention rests partially on selective oxidation of vegetable growths, as wood, cotton seed hulls, etc., by means of oxygen and partially on the extraction of the resinous matter from these growths. In other words, the resinous, or so-called ligno, contents of the vegetable matter is oxidized, or partially oxidized and partially extracted, or practically completely extracted, leaving the cellulose intact. Such cellulose, of course, is used principally as a pulp for paper manufacture, although cellulose secured from waste cotton seed hulls should be fully satisfactory for use in explosive materials, rayon, etc.

Initially I attempted to secure resin extraction with organic solvents. Digestion with benzol, carbontetrachloride, etc., at temperatures between fifty and two hundred and fifty degrees centigrade failed, however, to give processing which appeared to have any commercial advantages.

Subsequently I used ammonia and organic solvents with recovery of the ammonia. In this connection I noticed that if a small percentage of resinous matter were dissolved in the higher alcohols that they became miscible with water and this solvent together with ammonia represented a fairly good extraction aid but high temperatures and prolonged digestion has to be employed. Selective oxidation was attempted with the use of oxygen and of many catalysts, and again with and without the use of water vapor. The oxides of nitrogen appeared the most advantageous catalysts found, but even they, when employed alone in conjunction with oxygen, did not establish sufficiently perfect results for practically commercial application. Ultimately very satisfactory solutions, both as regards selective oxidation and extraction methods, or combinations thereof, were obtained or inventions made.

It is known and processing has been patented on the disintegration of wood by dilute nitric acid solutions. As noted, I tried such digestion or disintegration with nitric acid, both cold and hot, and subsequently by passing nitric oxide through a bath of carbontetrachloride surrounding the wood chips and also by extraction with carbontetrachloride in a closed system in conjunction with the use of nitric oxide and of oxygen. The latter step represented a positive one. Subsequently I tried the action of nitric acid and fuming acids on the wood chips immersed in carbontetrachloride. The action of the acid is very rapid, even at room temperature. The resin content is quickly destroyed, or altered, so that subsequent extraction with caustic soda solutions is easily attained. Carbontetrachloride and nitric acid are not miscible so that I used most advantageously the highest specific gravity fuming nitric acid for the digestion work. The gravities vary so little if thorough mixing is established separation is slow. After such thorough mixing the wood chips were quickly immersed. Digestion or disintegration is rapid, even at room temperature, requiring only a few hours, and if the carbontetrachloride is brought to boil under a condensation system I found complete digestion in some forty minutes. The advantage of the processing lies in such rapid digestion, the low requirement of nitric acid and the high yield of fibre secured, as well as its excellent quality. I used but about half, some twenty-five percent, of nitric acid which I found requisite in the slow aqueous acid digestion. The carbontetrachloride is of course recoverable. The fibre liberation is finally brought about by hot or boiling dilute caustic soda solution. From this resins can be secured by acidification. The beauty of the processing is also still further enhanced by the use of oxygen, for partial nitric acid replacement, under suitable mechanical operations or aids to the chemical digestion. These I describe subsequently.

In my semi-oxidation, semi-extraction processing the wood was treated in a vapor of carbontetrachloride with ammonia and oxygen, and with or without water vapor. For instance, 20 grams of wood chips, such as are commonly used in paper pulp manufacture, were placed in one and one-half inch double extra heavy steel tube sixteen inches long. Into the same tube some five cubic centimeters of aqua ammonia and twenty cubic centimeters of carbontetrachloride were first run and the chips were separated from the liquid content by a false bottom. After closing of the tube with a steel plug fitted with a needle valve and gauge oxygen was forced into the same up to one hundred pounds pressure. The tube was then heated in a water bath for two and one-half hours at one hundred degrees centigrade. Upon removal of the residual wood content of the tube and boiling with caustic soda solution, fairly good fibres were secured, and resinous matter was found partially dissolved in the carbontetrachloride and partially precipitated but separated from the cellulose fibre. The ammonia was first neutralized with acid and the aqueous solution separated from the carbontetrachloride. Very similar results were secured with the use of anhydrous ammonia, carbontetrachloride and oxygen. Water vapor, nevertheless, appeared to act catalytically in the aid of oxidation and of extraction of cellulose in all of my findings. I did not use "bonedry" wood, but merely that secured from regular paper mill operations so that some moisture was always present. Whether or not water vapor is required I cannot thus positively state.

As partial decomposition of the carbontetrachloride appeared to take place, probably through the action of ammonia, digestion with benzol and ammonia was practiced, without the use of oxygen, and found positive, as also with ammonia, in an atmosphere, about one hundred pounds pressure, of hydrogen. Furthermore similar digestions were made with sulphur dioxide in place of ammonia, both with carbontetrachloride and oxygen, and benzol and with benzol in an atmosphere of oxygen. The sulphur dioxide brings about similar disintegration and extraction, but the quality of the cellulose fibre was vitiated, and the resin also badly attacked.

For practical operation of the processing I found that during digestion the use of mechanical disintegration was very advantageous. The mechanical features involved in the latter step I described in my Patent Number 1,820,276 of August 25, 1931. Suffice it to say, that according to the latter metal beater bars carried on a rapidly rotating shaft aid disintegration of the wood during its digestion. In carrying out my processing with use of this type of digestion, about fifty percent of benzol on the weight of dry wood was first run into the same, the chips were then fed to the digester, and subsequently ammonia, to about five to ten percent content. The digester was externally heated to about one hundred degrees centigrade and the beating continued for one and one-half hours; the beating was then discontinued, benzol run in and heating continued for one-half hour, when the benzol was withdrawn from the digester. Hot water containing about two percent sodium hydroxide was then run into the digester and heating and beating continued for another half hour. The pulp was then withdrawn from the digester, screened and washed. The benzol was then distilled off from the resinous matter secured with the use of water vapor or steam and a fractionating column.

The ammonia may, of course, be liberated or replaced from the resins with sodium hydroxide, by simply heating in aqueous solution.

In using the mechanical processing with fuming nitric acid about ten percent was employed calculated as nitric acid and the digestion carried out in an atmosphere of oxygen at one hundred pounds pressure. In large scale operation in which the action of surface to cubical contents would be greatly reduced, it is probable that this percentage of nitric acid used could be also materially reduced, since the percentage of loss would be greatly lessened.

In this work, of course, an adequate factor of safety was allowed for explosion. Only one such occurrence took place when I was working with oxygen in conjunction with liquid sulphur dioxide, with generation of the oxides of nitrogen from copper and nitric acid. It is possible that nitrosyl sulphuryl compounds were rapidly formed and that these caused the very rapid oxidation or burning. Otherwise I worked in some instances with as high as five hundred pounds pressure of pure oxygen without explosion. Naturally acid proof linings have to be employed in the apparatus, as for instance chrome-nickel-iron alloys.

With a larger digester and adequate installation I figure that sufficient heat would be retained by the same from the final hot water washing to vaporize the initial benzol utilized in the digestion so that no steam would have to be used for the processing, and only hot water employed. The great commercial saving by my processing should be apparent alone from the saving accrued from this latter step as well as from the relatively inexpensive installation costs, greatly enhanced cellulose pulp yields, lack of necessity of subsequent beating of the pulp, etc.

Cotton seed hulls, vegetable weeds, grass, etc. were similarly digested, both with nitric acid and with ammonia. My processing covers initially the mere liberation of cellulose and subsequently such liberation with resin recovery, although in both cases some resins are recovered either from the caustic soda solution as sodium salts, or again as ammonium salts, or by precipitation with acids. Experimentation was extensive and only a brief outline is submitted in order neither unduly to burden the Patent Office nor myself I believe that the matter of invention has been basically covered. Modifications, of course, could be submitted ad infinitum. To close I may state that the extraction methods I found would never be practical without mechanical aid, whereas the nitric acid carbontetrachloride decomposition step, constituting the first or primary basis of my invention is practical without such aid, although the mechanical step enhances its value considerably because of much more rapid and perfect decomposition; moreover the wood chips do not have to be prepared with the same care or cut into the smaller size pieces.

In conclusion I may state that twenty-five to fifty percent higher yields of pulp were secured by my processing than by digestion with aqueous solutions which I used and that are commonly employed.

I claim:

1. In a process for the digestion of vegetable growths to secure cellulose fibre the step of subjecting the said growths to the action of nitric acid and carbontetrachloride.

2. In a process for the digestion of vegetable growths to secure cellulose fibre the step of subjecting the said growths to the action of fuming nitric acid and carbontetrachloride.

3. In a process for the digestion of vegetable growths to secure cellulose fibre the step of subjecting the said growths to the action of fuming nitric acid and carbontetrachloride and at a temperature above the boiling point of carbontetrachloride.

4. In a process for the digestion of vegetable growths to secure cellulose fibre the step of subjecting the said growths to the action of fuming nitric acid, oxygen and carbontetrachloride, and subsequently extracting the resinous material rendered soluble by said processing by means of a hot solution of sodium hydroxide.

5. In a process for the digestion of vegetable growths to secure cellulose fibre the step of subjecting the said growths to the action of fuming nitric acid, oxygen and carbontetrachloride and at a temperature above the boiling point of carbontetrachloride and the step of disintegrating the said vegetable material mechanically by the action of rapidly moving metal pieces simultaneously with the process of digestion and subsequently extracting the resinous material rendered soluble by said processing by means of a hot solution of sodium hydroxide.

HERMAN B. KIPPER.